United States Patent
Glynn et al.

(10) Patent No.: US 8,726,787 B2
(45) Date of Patent: May 20, 2014

(54) ROTARY HYDRAULIC ACTUATOR WITH HYDRAULICALLY CONTROLLED POSITION LIMITS

(75) Inventors: Christopher Charles Glynn, Lawrenceburg, IN (US); Darek Tom Zatorski, Fort Wright, KY (US); Nicholas Rowe Dinsmore, Cincinnati, OH (US); Brandon Wayne Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 714 days.

(21) Appl. No.: 13/051,468

(22) Filed: Mar. 18, 2011

(65) Prior Publication Data

US 2012/0237379 A1    Sep. 20, 2012

(51) Int. Cl.
*F01C 9/00* (2006.01)

(52) U.S. Cl.
USPC .............................. 92/122; 92/121

(58) Field of Classification Search
CPC ....... F15B 15/12; F15B 15/125; B64C 11/38; B64C 11/385; B64C 11/40; B64C 11/42
USPC .......................... 92/120, 121, 122
See application file for complete search history.

(56) References Cited

U.S. PATENT DOCUMENTS

| | | |
|---|---|---|
| 1,894,047 A | 1/1933 | Lilley |
| 1,894,048 A | 1/1933 | Lilley |
| 2,032,255 A | 2/1936 | Caldwell |
| 2,160,025 A | 5/1939 | Martin |
| 2,179,492 A | 11/1939 | Caldwell |
| 2,204,639 A | 6/1940 | Woodward |
| 2,280,713 A | 4/1942 | Martin et al. |
| 2,308,488 A | 1/1943 | Caldwell |
| 2,343,416 A | 3/1944 | Keller |
| 2,346,979 A | 4/1944 | Lilley |
| 2,353,566 A | 7/1944 | Keller |
| 2,357,400 A | 9/1944 | Haines |
| 2,363,670 A | 11/1944 | Hoover |
| 2,375,429 A | 5/1945 | Martin |
| 2,402,065 A | 6/1946 | Martin |
| 2,388,276 A | 11/1946 | McCoy |
| 2,413,439 A | 12/1946 | Drake |
| 2,423,400 A | 7/1947 | Nichols |
| 2,424,749 A | 7/1947 | Haines |
| 2,427,586 A | 9/1947 | Biermann |
| 2,433,990 A | 1/1948 | Hardy |
| 2,437,701 A | 3/1948 | McCoy |

(Continued)

*Primary Examiner* — Edward Landrum
*Assistant Examiner* — Logan Kraft
(74) *Attorney, Agent, or Firm* — William Scott Andes; Trego, Hines & Ladenheim, PLLC

(57) ABSTRACT

A rotary hydraulic actuator includes a housing defining a chamber, a first boss, and a port block with a bore communicating with the chamber. The port block includes rotor supply and drain ports communicating with the bore, and a stator port communicating with the chamber through a stator hole in the boss. A rotor mounted in the internal chamber includes: a body with a laterally-extending arm; a first stub shaft received in the bore, the first stub shaft including base slots passing laterally therethrough; a first rotor port disposed in the arm in communication with the internal chamber, and oriented in a tangential direction relative to an axis of rotation; and internal passages which interconnect the rotor base slots and the first rotor port. Passages in the port block communicate with the bore and interconnect the rotor supply and drain ports at a first angular position of the rotor.

12 Claims, 7 Drawing Sheets

(56) References Cited

U.S. PATENT DOCUMENTS

| | | |
|---|---|---|
| 2,466,775 A | 4/1949 | Martin |
| 2,484,603 A | 10/1949 | Audemar et al. |
| 2,488,686 A | 11/1949 | Sensenich |
| 2,504,209 A | 4/1950 | Martin |
| 2,507,671 A | 5/1950 | May |
| 2,515,037 A | 7/1950 | Hardy |
| 2,527,022 A | 10/1950 | Hardy |
| 2,549,108 A | 4/1951 | Martin |
| 2,550,529 A | 4/1951 | Carson et al. |
| 2,590,940 A | 4/1952 | Collins |
| 3,163,231 A | 12/1964 | Barnes |
| 3,212,586 A | 10/1965 | Barnes |
| 3,219,121 A | 11/1965 | Barden |
| 3,249,159 A | 5/1966 | Biermann |
| 3,380,535 A | 4/1968 | Biermann |
| 4,533,295 A | 8/1985 | Duchesneau |
| 4,759,186 A * | 7/1988 | Sugden .......... 60/473 |
| 4,772,181 A | 9/1988 | Poucher |
| 5,186,608 A | 2/1993 | Bagge |
| 5,213,471 A | 5/1993 | Miller |
| 5,242,265 A | 9/1993 | Hora |
| 6,196,801 B1 | 3/2001 | Mühlbauer |

\* cited by examiner

ROTARY HYDRAULIC ACTUATOR WITH HYDRAULICALLY CONTROLLED POSITION LIMITS

BACKGROUND OF THE INVENTION

This invention relates generally to hydraulic actuators and more particularly to motion control for such actuators.

Aircraft powerplants are typically used to drive thrust-generating airfoil elements such as propellers or fan blades. It is known to vary the angle of incidence (i.e. "pitch angle") of the airfoil elements relative to the rotating hub carrying them, in order to provide the maximum possible propulsive efficiency at various flight conditions.

A common method of pitch control employs a hydraulic actuator which changes the blade pitch angle in response to pressurized fluid flow. The actuator may move the blade through pitch angles from "coarse" to "fine" and may also provide pitch angles suitable for ground operation. For safety reasons, it is important to limit the blade pitch angle during flight. This avoids overspeeding the powerplant, or imposing excessive structural loads or unexpected yawing moments to the aircraft. A typical prior art variable-pitch propeller includes a mechanical pitch stop or lock which limits the blade pitch angle and must be manually retracted in order to move the blades towards positions in the ground operating range.

While mechanical pitch stops are effective, they add complexity, weight, and cost to the basic actuator device. Accordingly, there is a need for an actuator which provides two ranges of rotary movement without a mechanical lock or stop to define the limit between ranges.

BRIEF SUMMARY OF THE INVENTION

This need is addressed by the present invention, which provides a rotary actuator having two ranges of operation, where the limit between the ranges is controlled hydraulically.

According to one aspect of the invention, a rotary hydraulic actuator apparatus includes: a housing including: a peripheral wall and an end wall which cooperatively define a generally cylindrical internal chamber, where a first boss extends radially inward from the peripheral wall; and a port block defining a cylindrical bore communicating with the end wall, the port block further including a rotor supply port and a rotor drain port communicating with the bore, and a stator port communicating with the internal chamber through a stator hole in the boss. A rotor is mounted for rotation in the internal chamber about an axis of rotation, the rotor including: a body with an arm extending laterally-outward therefrom; a first stub shaft which is received in the bore of the housing, the first stub shaft including base slots passing laterally therethrough; a first rotor port which is disposed in the arm in communication with the internal chamber, and oriented in a tangential direction relative to the axis of rotation; and internal passages which interconnect the rotor base slots and the first rotor port. Passages in the port block communicating with the bore are configured to interconnect the rotor supply port and the rotor drain port through the rotor base slots, at a preselected first angular position of the rotor relative to the housing.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
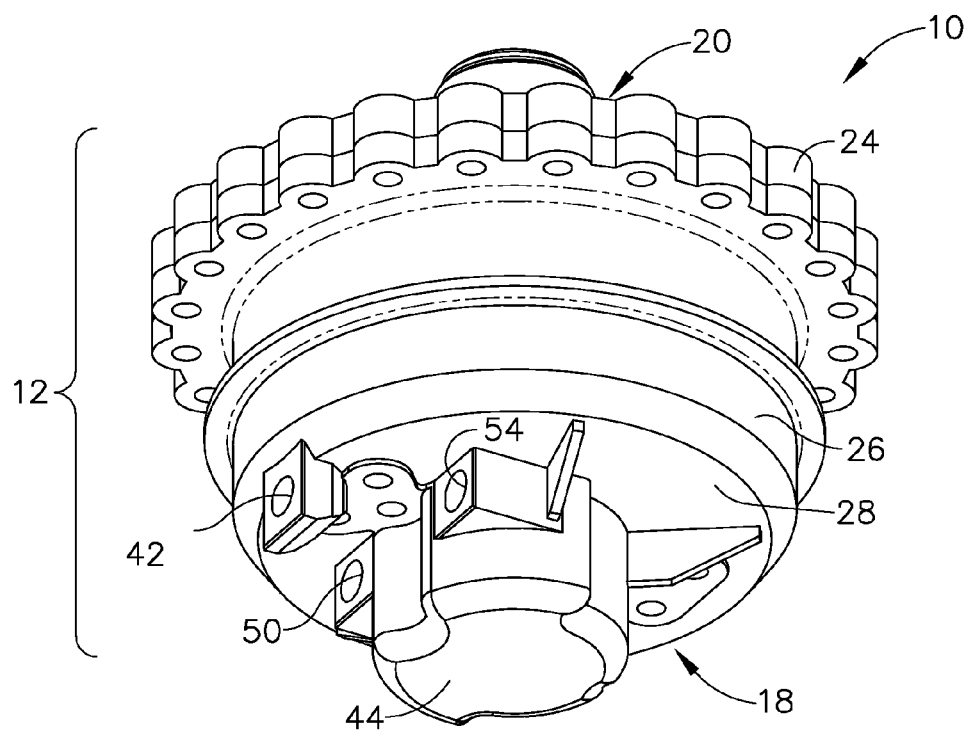
FIG. 1 is perspective exterior view of a rotary hydraulic actuator constructed according to an aspect of the present invention.
Figure 2:
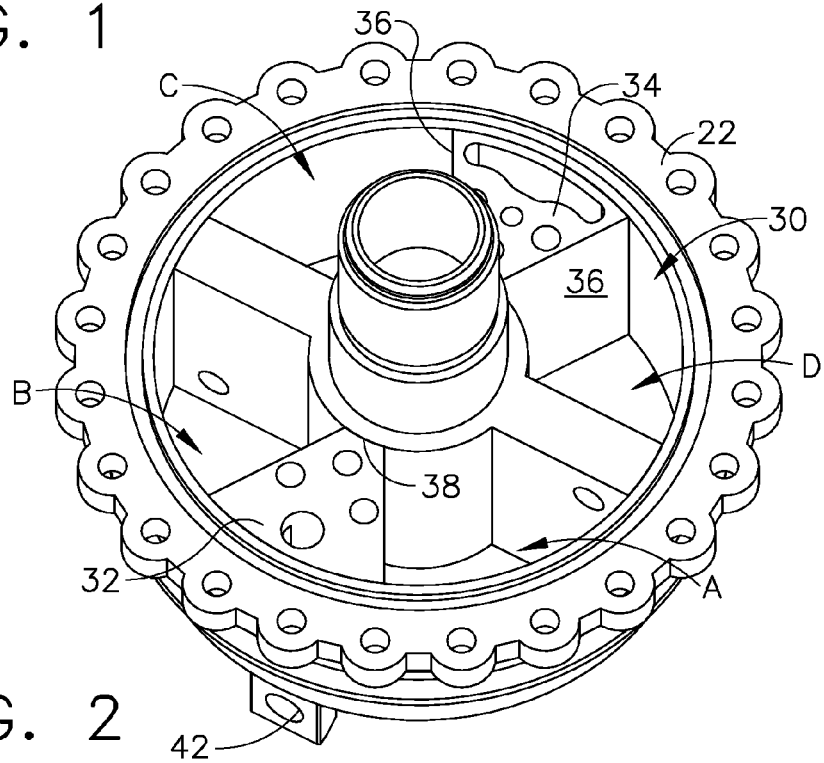
FIG. 2 is a perspective view of the actuator of FIG. 1, with a cover thereof removed.

Referring to the drawings wherein identical reference numerals denote the same elements throughout the various views, FIGS. 1 and 2 depict a rotary hydraulic actuator 10 constructed according to the invention. The major components of the actuator 10 are a housing 12 and a rotor 14. As described in more detail below, the actuator 10 is operable to produce controlled rotary motion of the rotor 14 when the actuator 10 is provided with a flow of pressurized hydraulic fluid to its various ports. While it may be used for any mechanical load that requires rotary motion, the actuator 10 is particularly useful for controlling the pitch angle of an airfoil, such as gas turbine engine fan blade or a propeller blade (not shown).

The housing 12 has an inboard end 18 and an outboard end 20, and is assembled from a base 22 and a cover 24 which are assembled to each other by bolts or other suitable fasteners. The housing 12 has a peripheral wall 26 and an end wall 28 which cooperatively define a generally cylindrical internal chamber 30. Two opposed bosses 32 and 34 protrude towards the center of the otherwise cylindrical internal chamber 30. Each boss 32, 34 is wedge-shaped with two spaced-apart planar side walls 36 and a concave-curved end wall 38. One of the bosses 32 has a stator supply hole 40 formed therein (best seen in FIG. 4). The stator supply hole 40 is open to the interior of the internal chamber 30 and also communicates, through internal passages which are not shown, with a stator port 42 (seen in FIG. 1). It should be noted that terms such as "supply" and "drain", as used herein, serve merely as a convenient reference and do not necessarily describe the sole function of a particular port or structure.

Figure 5:
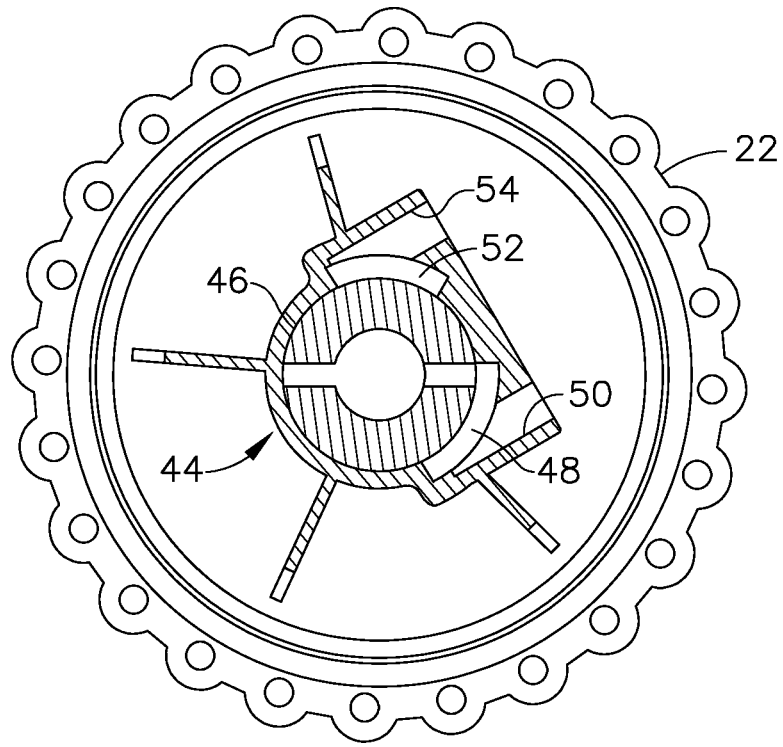
FIG. 5 is a schematic cross-sectional view of the actuator of FIG. 1, taken through an end portion thereof, with the rotor in a first position.

A port block 44 protrudes from the end wall 28 of the base 22. As best seen in FIG. 5, the port block 44 includes a closed-ended cylindrical bore 46. A rotor supply groove 48 extends around a portion of the bore 46, and communicates with both the bore 46 and a rotor supply port 50. A rotor drain groove 52 extends around a portion of the bore 46, and communicates with both the bore 46 and a rotor drain port 54.

Figure 3:
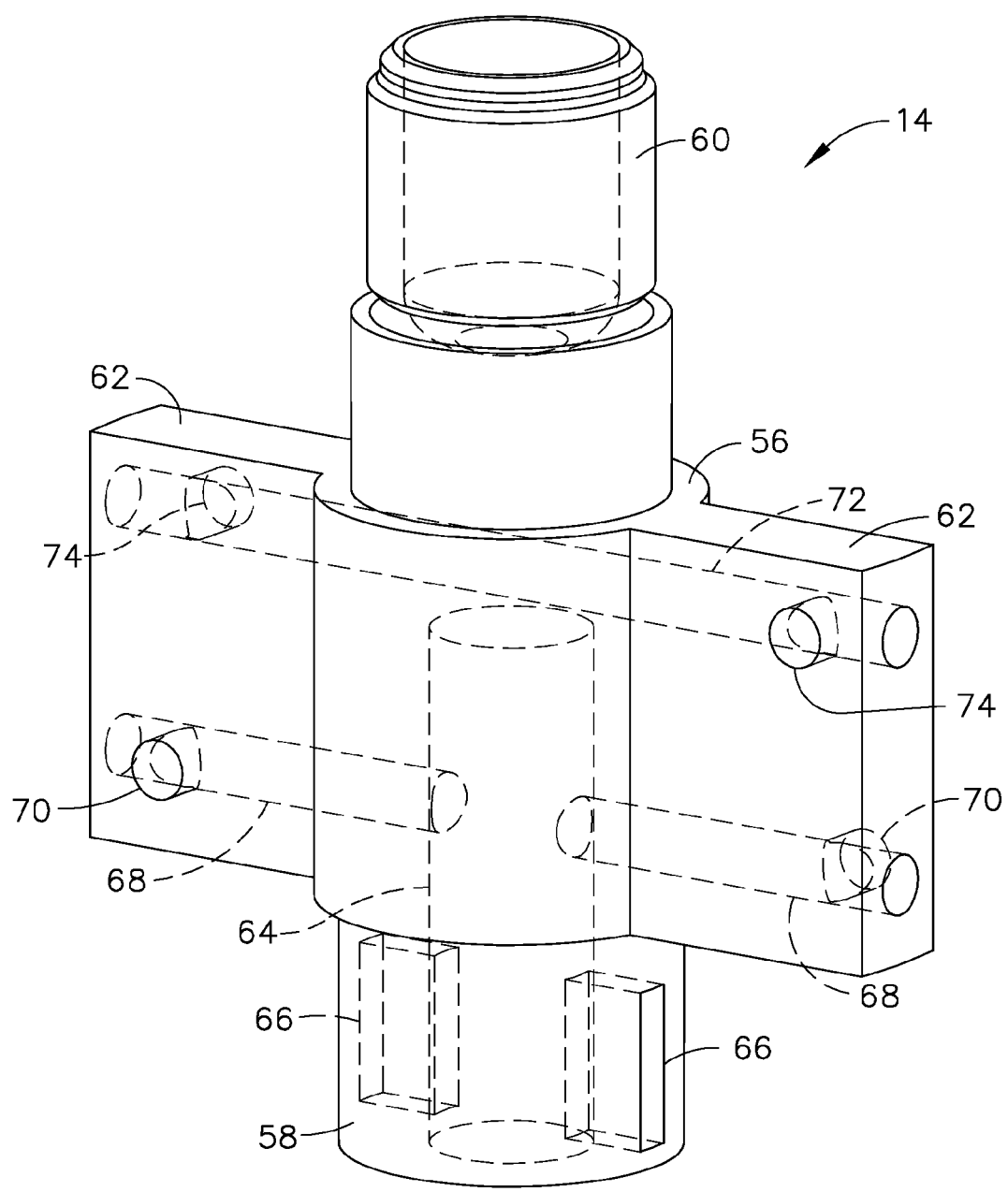
FIG. 3 is a perspective view of a rotor of the actuator of FIG. 1.

The rotor 14 is shown in FIG. 3. It has a generally cylindrical body 56 with inboard and outboard stub shafts 58 and 60 extending from opposite ends thereof. The body 56 is sized to be received between the bosses 32, 34, and two generally rectangular arms 62 extend laterally from the body 56 in opposite directions. The outboard stub shaft 60 is adapted to be coupled to a mechanical load to be rotated, such as a fan or propeller blade. The inboard stub shaft 58 is sized to be received in the bore 46 of the port block 44. The rotor 14 may include different numbers of arms to suit a particular application; for example only one arm, or more than two arms may be provided. In general the housing 12 would include one boss for each arm of the rotor 14.

The rotor 14 includes several internal passages. A central gallery 64 extends upward through the inboard stub shaft 58 and partway into the body 56. Diametrically-opposed base slots 66 extend between the central gallery 64 and the outer peripheral surface of the inboard stub shaft 58. An inboard lateral gallery 68 extends from one arm 62 through the body 56 and the central gallery 64 into the opposite arm 62. An inboard rotor port 70 extends from each end of the inboard lateral gallery 68, in a direction perpendicular to the inboard lateral gallery 68 (i.e. tangential to an axis of rotation of the rotor 14), and is open to the exterior of the associated arm 62. An outboard lateral gallery 72 extends from one arm 62 through the body 56 into the opposite arm 62. An outboard rotor port 74 extends from each end of the outboard lateral gallery 72, in a direction perpendicular to the outboard lateral gallery 72 (i.e. tangential to an axis of rotation of the rotor 14) and is open to the exterior of the associated arm 62. The ends of the lateral galleries 68 and 72 may be open or may be closed off with plugs.

When assembled into the housing 12 the rotor 14 is free to rotate about its axis of rotation, which is parallel to the stub shafts 58 and 60, between two limiting positions at which the arms 62 contact the bosses 32 and 34. The arms 62 effectively divide the internal chamber 30 into four separate cavities. The size of these cavities will change as the rotor 14 moves. Solely for the sake of reference, the cavities are labeled in FIG. 2 as "A", "B", "C", and "D".

Figure 12:
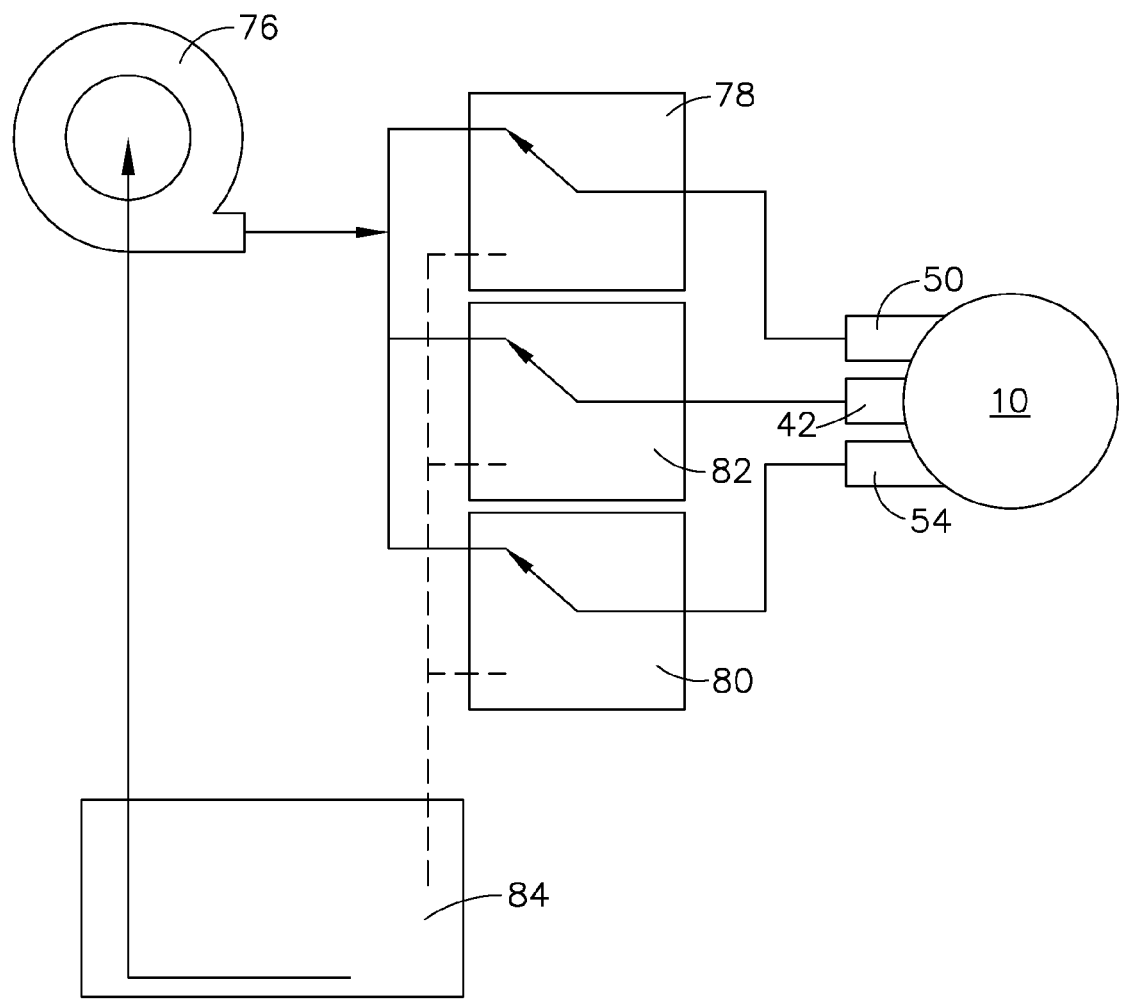
FIG. 12 is a schematic view of a rotary hydraulic actuator coupled to a pump and valve system.

Means are provided for selectively porting pressurized hydraulic fluid to the actuator 10. FIG. 12 shows schematically a system which includes a pump 76, three three-position valves 78, 80, and 82 which are coupled to the rotor supply port 50, rotor drain port 54, and stator port 42, respectively, and a reservoir 84. Each valve 78, 80, and 82 is operable to connect the associated port to the pump outlet pressure or the reservoir 84. The valves 78, 80, and 82 may be operated by any convenient means, such as manual, hydraulic, or electric control. While this simple schematic system is used to explain the basic hydraulic operation of the actuator 10, it will be understood that other control systems may be provided in order to incorporate the actuator 10 within a practical aircraft system. In particular, a propeller governing or constant-speed mechanism of a known type may be provided.

The general operation of the actuator 10 will now be described with reference to FIGS. 2-11 and in the context of using the actuator 10 to control the position of a propeller blade (not shown). As shown in FIGS. 4-11, the direction of aircraft flight would be towards the left of the page, and the direction of propeller rotation would be towards the top of the page. Within FIGS. 4-11, the upper figure in each pair figures depicts the actuator 10 at one cross-section through the arms 62, and the lower figure of the pair depicts the actuator 10 at a cross-section through the inboard stub shaft 58. Rotating the rotor 14 counter-clockwise would be considered increasing the pitch angle (e.g. "coarse pitch") and rotating the rotor 14 clockwise would be considered decreasing the pitch angle (e.g. "fine pitch").

To move the rotor 14 clockwise, the rotor supply port 50 is pressurized by coupling it to the pump output pressure, the rotor drain port 54 is coupled to the reservoir 84, and the stator port 42 is coupled to the reservoir 84. This causes pressurized fluid to flow through the rotor base slots 66, and into the inboard lateral galleries 68, and then finally out the inboard rotor ports 70. The fluid exiting the inboard rotor ports 70 fills cavities B and D (see FIG. 2). The resulting fluid pressure on the arms 62 drives the rotor 14 clockwise. As this is happening, the arms 62 displace fluid from the opposed cavities A and C. The fluid displaced from cavity A flows out through the stator supply hole 40 and thence to the stator port 42. The fluid displaced from cavity C flows into an outboard rotor port 74, across the outboard lateral gallery 72, out the opposed outboard rotor port 74, and then out through the stator supply hole 40 and thence to the reservoir 84.

To move the rotor 14 counter-clockwise the following events happen: The rotor supply port 50 is coupled to the reservoir 84 the rotor drain port 54 is also open to the reservoir 84, and the stator port 42 is pressurized by coupling it to the pump output pressure. This causes pressurized fluid to flow out of the stator supply hole 40 and fill cavity A. Some of the fluid flows into an outboard rotor port 74, across the outboard lateral gallery 72, and out the opposed outboard rotor port 74 into cavity C. The resulting fluid pressure on the arms 62 drives the rotor 14 counter-clockwise. As this is happening, the arms 62 displace fluid from the opposed cavities B and D. Fluid displaced from cavities B and D flows into the inboard rotor ports 70, into the inboard lateral galleries 68, then the central gallery 64, to the rotor base slots 66, and then out either the rotor supply port 50, the rotor drain port 54, or both (depending on the position of the rotor 14).

Figure 4:
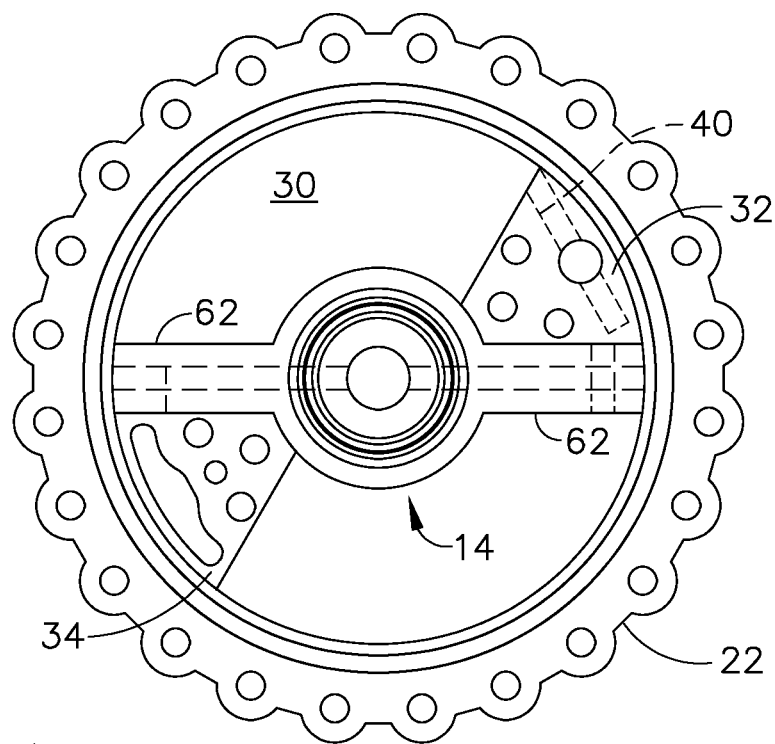
FIG. 4 is a schematic cross-sectional view of the actuator taken through a middle portion thereof, with the rotor in a first position.

Referring to FIGS. 4 and 5, the rotor 14 is depicted in a fully counter-clockwise position corresponding to a propeller "high pitch" or "full coarse" position. In this position, further counter-clockwise movement is prevented by interference of the rotor 14 and the bosses 32 and 34. This is considered a "hard stop".

Figure 6:
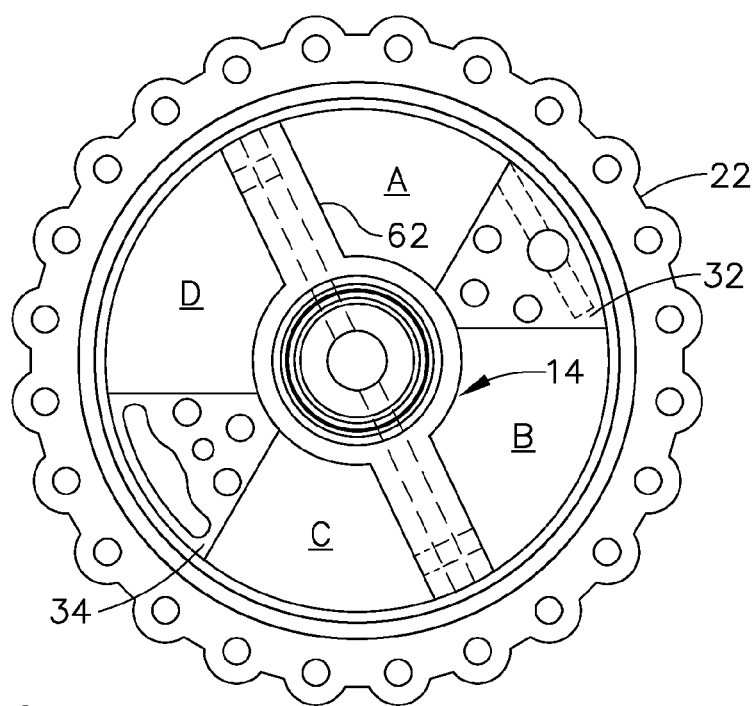
FIG. 6 is a schematic cross-sectional view of the actuator taken through a middle portion thereof, with the rotor in a second position.
Figure 7:
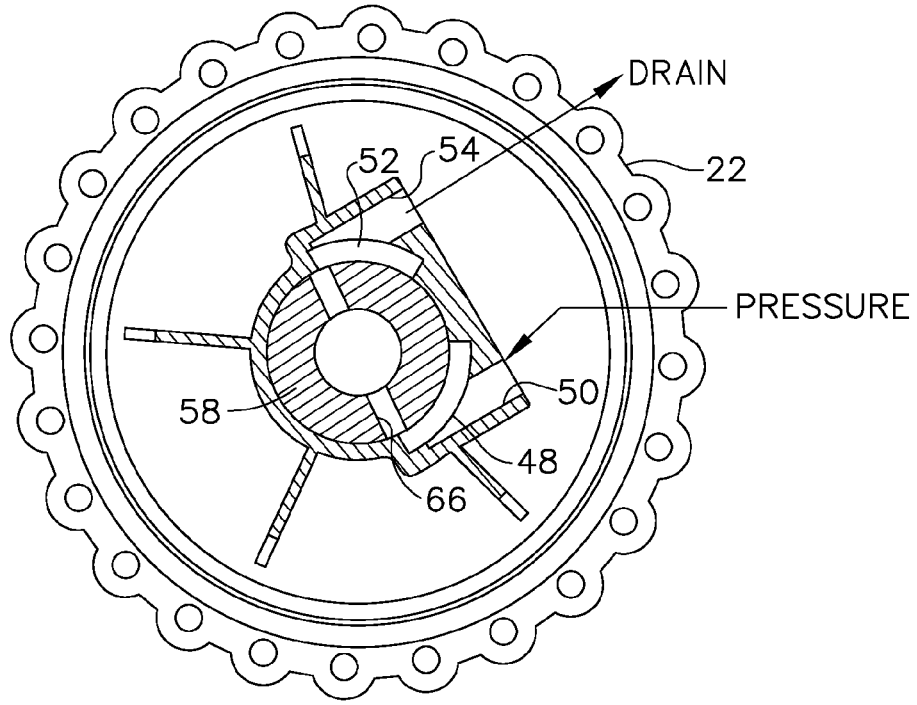
FIG. 7 is a schematic cross-sectional view of the actuator of FIG. 1, taken through an end portion thereof, with the rotor in a second position.

FIGS. 6 and 7 depict the rotor 14 at a "full fine" or minimum flight pitch position. In this position, the base slots 66 connect the rotor supply groove 48 and the rotor drain groove 52, and thus interconnect the rotor supply port 50 and the rotor drain port 54. If the fluid supply is configured for clockwise motion as described above, any pressurized fluid from the rotor supply port 50 will bypass the rotor 14 and drain directly back to the reservoir 84. As a result, no further clockwise rotation occurs. Conversely, if the fluid supply is configured for counter-clockwise motion as described above, operation will be normal. In effect there is a "hydraulic" or "soft stop" limit to clockwise rotation. The range of motion between the counter-clockwise limit shown in FIGS. 4 and 5, and the clockwise limit shown in FIGS. 6 and 7 can be conceptualized as a first range of motion, which would correspond to an in-flight pitch angle range.

Figure 8:
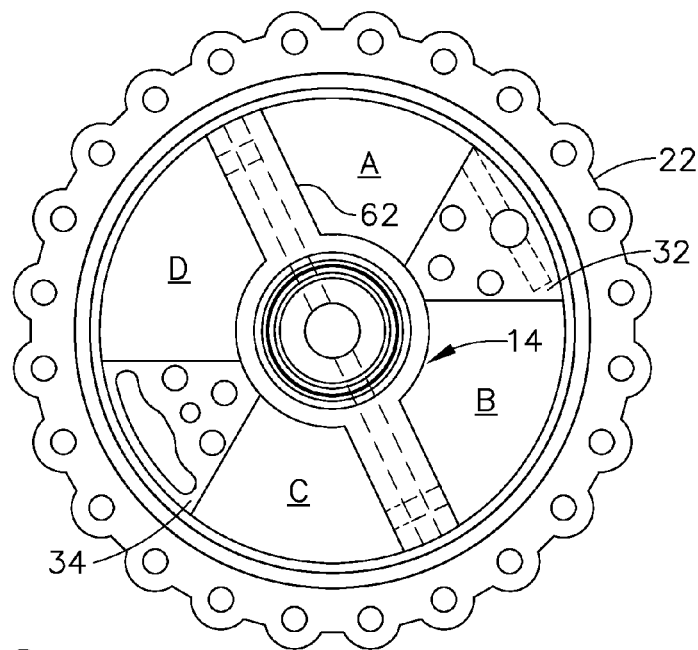
FIG. 8 is a schematic cross-sectional view of the actuator taken through a middle portion thereof, with the rotor in a third position.
Figure 9:
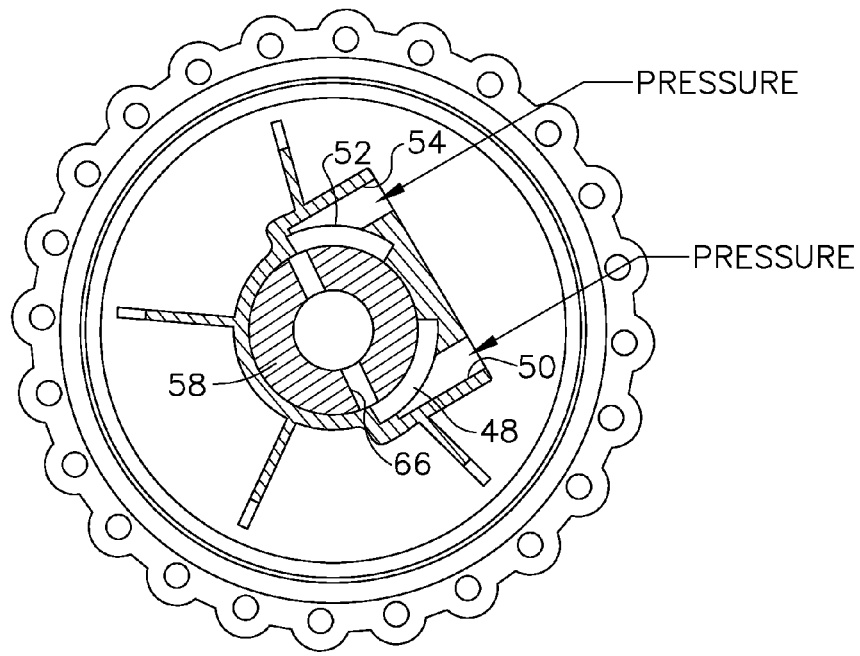
FIG. 9 is a schematic cross-sectional view of the actuator of FIG. 1, taken through an end portion thereof, with the rotor in a third position.

FIGS. 8 and 9 show how a transition can be made from the "soft stop" described above to permit further clockwise motion. In practice, positions further clockwise would be needed to provide low blade pitch angles (e.g. for "ground fine" or "beta" operation), or to provide reverse thrust. In this position, the rotor supply port 50 and the rotor drain port 54 are both pressurized and the stator port 42 is coupled to the reservoir 84. The rotor drain port pressure balances the rotor supply port pressure, which allows pressurized fluid to flow into the central gallery 64 and effectuate further clockwise movement of the rotor 14, as described above.

Figure 10:
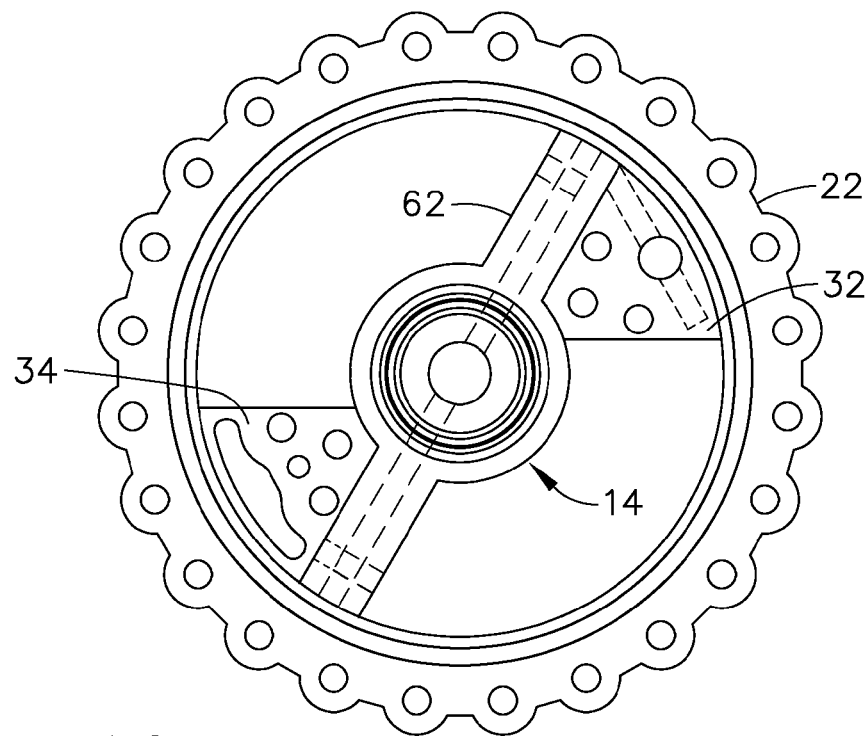
FIG. 10 is a schematic cross-sectional view of the actuator taken through a middle portion thereof, with the rotor in a fourth position.
Figure 11:
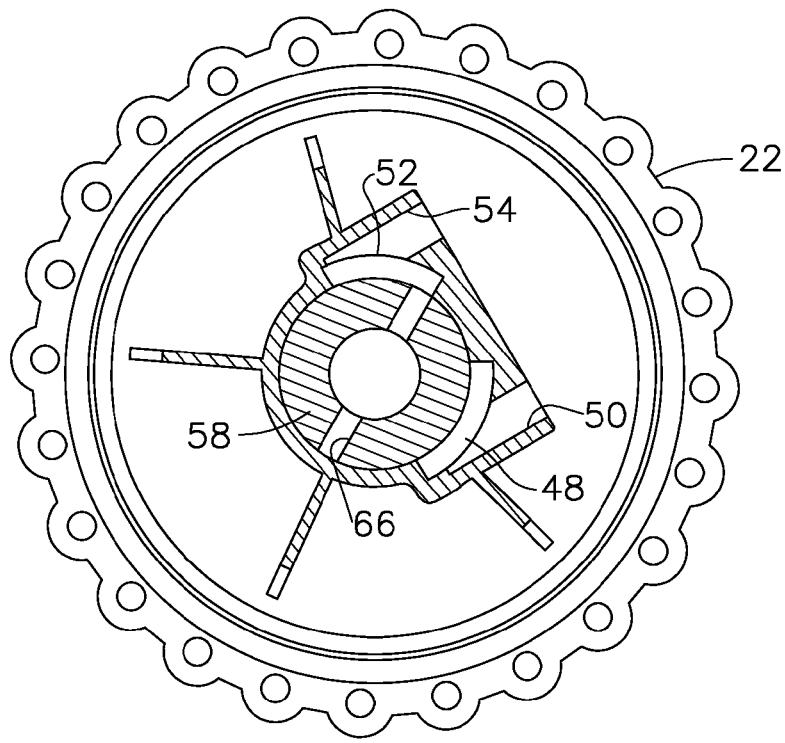
FIG. 11 is a schematic cross-sectional view of the actuator of FIG. 1, taken through an end portion thereof, with the rotor in a fourth position.

FIGS. 10 and 11 depict the rotor in the maximum clockwise or "max reverse" position. In this position, further clockwise movement is prevented by interference of the rotor 14 and the bosses 32 and 34. This is considered a "hard stop". The range of motion between the counter-clockwise limit shown in FIGS. 4 and 5, and the clockwise limit shown in FIGS. 10 and 11 can be conceptualized as a second range of motion, greater than the first range described above.

The actuator 10 described above provides two different available ranges of motion. When in the limited mode, the actuation angle is less than when it is not limited. This limit is imposed using entirely hydraulic control, avoiding the weight, complexity, and complication associated with a prior art mechanical stop. This actuator will be especially useful to provide compact, simple pitch control of aircraft propellers and fan blades.

The foregoing has described a rotary hydraulic actuator. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A rotary hydraulic actuator apparatus, comprising:
 a housing including:
  a peripheral wall and an end wall which cooperatively define a generally cylindrical internal chamber, where a first boss extends radially inward from the peripheral wall; and
  a port block defining a cylindrical bore communicating with the end wall, the port block further including a rotor supply port and a rotor drain port communicating with the bore, and a stator port communicating with the internal chamber through a stator hole in the boss;
 a rotor mounted for rotation in the internal chamber about an axis of rotation, the rotor including:
  a body with an arm extending laterally-outward therefrom;
  a first stub shaft which is received in the bore of the housing, the first stub shaft including base slots passing laterally therethrough;
  a first rotor port which is disposed in the arm in communication with the internal chamber, and oriented in a tangential direction relative to the axis of rotation; and
  internal passages which interconnect the rotor base slots and the first rotor port; and
 passages in the port block communicating with the bore and configured to interconnect the rotor supply port and the rotor drain port through the rotor base slots, at a preselected first angular position of the rotor relative to the housing.

2. The apparatus of claim 1 wherein the passages in the port block comprise:
 a rotor supply groove extending around a portion of the bore, and communicates with both the bore and the rotor supply port; and
 A rotor drain groove extending around a portion of the bore, and communicating with both the bore and the rotor drain port.

3. The apparatus of claim 1 wherein the rotor includes a second rotor port which is disposed in the arm in communication with the internal chamber, and oriented in a tangential direction relative to the rotor, wherein the second rotor port is oriented opposite to the first rotor port.

4. The apparatus of claim 1 wherein a second boss extends radially inward from the peripheral wall, opposite the first boss, and wherein the bosses are positioned to limit movement of the rotor to a range between second and third angular positions relative to the housing, where the first angular position lies between the second and third angular positions.

5. The apparatus of claim 1 wherein the housing comprises a base which includes the peripheral wall, the side wall, and the port block, and a cover attached to the base closing off the internal chamber.

6. The apparatus of claim 1 wherein the arm is generally a rectangular solid.

7. The apparatus of claim 1 wherein the first boss is wedge-shaped.

8. The apparatus of claim 1 wherein the body of the rotor includes a second stub shaft extending opposite from the first stub shaft.

9. The apparatus of claim 1 wherein the internal passages comprise a central gallery interconnecting the base slots, and a first lateral gallery extending from each of the first rotor ports to the central gallery.

10. The apparatus of claim 1 wherein the rotor includes two or more arms extending laterally-outward therefrom, each arm including a first rotor port which is disposed in the arm in communication with the internal chamber and the internal passages, and oriented in a tangential direction relative to the rotor.

11. A method of operating the rotary hydraulic actuator apparatus of claim 1 comprising selectively providing pressurized fluid to the rotor supply port or the stator port so as to rotate the rotor in a first direction or a second direction opposite the first direction, respectively; wherein movement in the first direction is limited between the first and second angular positions.

12. The method of claim 11 further comprising rotating the rotor in the first direction beyond the first angular position by simultaneously supplying pressure to both the rotor supply port and the rotor drain port.

* * * * *